United States Patent [19]

Kamerman et al.

[11] Patent Number: 6,067,291
[45] Date of Patent: May 23, 2000

[54] WIRELESS LOCAL AREA NETWORK WITH ENHANCED CARRIER SENSE PROVISION

[75] Inventors: Adriaan Kamerman; Leo Monteban, both of Nieuwegein; Rienk Mud, Wijk bij Duurstede, all of Netherlands

[73] Assignee: Lucent Technologies Inc., Murray Hill, N.J.

[21] Appl. No.: 08/936,033

[22] Filed: Sep. 23, 1997

[51] Int. Cl.[7] .................................................. H04Q 7/24
[52] U.S. Cl. ........................................ 370/338; 370/445
[58] Field of Search .................................. 370/338, 332, 370/333, 445, 448, 449, 459, 461, 462, 447; 375/317

[56] References Cited

U.S. PATENT DOCUMENTS

| | | | |
|---|---|---|---|
| 5,220,564 | 6/1993 | Tuch et al. | 370/94.1 |
| 5,422,887 | 6/1995 | Diepstraten et al. | 370/85.3 |
| 5,459,728 | 10/1995 | Yoshioka et al. | 370/95.3 |
| 5,553,316 | 9/1996 | Diepstraten et al. | 455/69 |
| 5,657,326 | 8/1997 | Burns et al. | 370/349 |
| 5,706,428 | 1/1998 | Boer et al. | 395/200 |

FOREIGN PATENT DOCUMENTS 0474489  3/1992  European Pat. Off. .

OTHER PUBLICATIONS

Ad Kamerman and Leo Monteban "High–Performance Wireless LAN for the Unlicensed " Bell Labs Technical Journal, summer 1997.

European Search Report dated Jan. 21, 1999.

A. Kamerman et al., "Wavelan–II: A High Performance Wireless LAN for the unlicensed Band" Bell Labs Technical Journal, vol. 2, No. 3, Jun. 21, 1997, pp 118–133.

Ad Kamerman, "Throughput Density Constraints for Wireless LAN's Based on DSSS", Proc. of Int. Symp. on Spread Spectrum Techniques & Applications, Mainz (Germany) Sep. 1996, pp. 1344–1350.

LaMaire, et al., "Wireless LAN's and Mobile Networking: Standards and Future Directions", IEEE Communication s Magazine, Aug. 1996, pp. 86–94.

Hashemi "Prolog to The Indoor Radio Propagation Channel", Proceedings of the IEEE, vol. 18, No. 7, Jul. 1993, pp. 941–961.

Reinaldo A. Valenzuela, "Ray Tracing Prediction of Indoor Radio Propagation", Personal, Indoor and Mobile Radio Communications, PIMRC'94, The Hague 1994, pp. 140–144.

G.J. Pottie, "System Design Choices in Personal Communications", IEEE Personal Communications, vol. 2, No. 5, Oct. 1995, pp. 50–67.

A Kamerman, "Spectrum Need and Medium Reuse Efficiency", IEEE First Symp. on Commun. and Vehicular Techn. in the Benelux, Delft, Oct. 1993, pp. 3.6-1—3.6-4.

M.A. Panjwani, A.L. Abbott, T.S. Rappaport, "Interactive Computation of Coverage Regions for Wireless Communication in Multifloored indoor Environments", IEEE J. on Select. Areas Commun., vol. 14, No. 3 Apr. 1996, pp. 420–430.

*Primary Examiner*—Chau Nguyen
*Assistant Examiner*—Forood Boortalary

[57] ABSTRACT

A method and system of operating a wireless local area network station adapted to transmit and receive a signal within a communication cell. The method includes the steps of establishing a carrier detect threshold level, establishing a defer threshold level, and transmitting a signal when the signal level detected by the network station is above the defer threshold level. Additionally, the method further includes the step of receiving a signal transmission intended for the network station when the power of the received signal transmission is above the carrier detect threshold level.

15 Claims, 3 Drawing Sheets

WIRELESS LOCAL AREA NETWORK WITH ENHANCED CARRIER SENSE PROVISION

FIELD OF THE INVENTION

This invention relates to wireless data communication systems and specifically to the utilization of an enhanced medium access control function by employing at least two signal level thresholds.

BACKGROUND OF THE INVENTION

With a view to obviate the need for wired cabling connections between stations in local area networks (LANs), wireless local area networks have been developed, and are now commercially available. These wireless local area networks employ a plurality of mobile network stations, which may be data processing devices (such as personal computers) having wireless communication capability.

In wired based networks, collision detection can be accomplished with a relative ease. However, for wireless based networks, which use a single channel, it is substantially difficult to detect collisions due to the large dynamic range of receive signal levels. Therefore, wireless local area networks typically employ a collision avoidance scheme, instead of collision detection.

Wireless local area networks, LANs, are generally configured based on a medium access control (MAC) arrangement that employs a listen-before-talk scheme like CSMA/CA (carrier sense multiple access with collision avoidance) as described by the IEEE 802.11 standard. In accordance with one embodiment described in the IEEE 802.11 standard, a wireless local area network includes an access point, which serves as a base station and a plurality of other network stations. The network stations within a group or a cell communicate directly to their corresponding access point. This access point forwards messages to the destination station within the same cell or through a wired distribution system to another access point, from which such messages arrive finally at a desired destination station.

In accordance with the medium access control (MAC) arrangement, each local area network station begins transmission when it determines that no other station is transmitting communication signals. To this end, each station defers its transmission of signals, so long as the signal level it receives from other stations is above a specifiable receive threshold level. Thus, the medium access control (MAC) arrangement prevents a second station remotely located from the first station, to start signal transmission that overlaps in time with an earlier started transmission by the first station. Typically, the second station defers its signal transmission for a randomly selected period of time.

A very short duration carrier detect turnaround time is fundamental for this random wait characteristic. For example, IEEE 802.11 DSSS (direct sequence spread spectrum) standard calls for a slotted random wait behavior based on 20 μsec (microsecond) time slots, which cover the carrier detect turnaround time.

Additionally, the medium access control (MAC) described by the IEEE 802.11 standard calls for one signal threshold level for both receive and defer modes. The lowest level of the receive threshold is also the level used for deferring. Accordingly, if the receiver detects any other signal above the receive threshold, it will stop transmitting. The IEEE 802.11 DSSS standard specifies a defer threshold that has to be equal or more sensitive than −70 dBm at a transmit power below 50 mW, −76 dBm at a transmit power between 50 and 100 mW, and −80 dBm at a transmit power between 100 mW and 1 Watt.

Referring to FIG. 1, the prior art method of providing a collision avoidance scheme is shown and described. Specifically, the IEEE 802.11 CSMA/CA protocol is designed to reduce the collision probability between multiple stations accessing the medium at the point where they would most likely occur. The highest probability of a collision would occur at the point in time just after the medium becomes free, following a busy medium. This is because multiple stations would have been waiting for the medium to become available again. Therefore, a random back off arrangement is used to resolve medium contention conflicts. As is evident to those skilled in the art, a very short duration carrier detect turnaround time is fundamental for this random wait characteristic. In addition, the IEEE 802.11 medium access control, MAC, defines an option for medium reservation via RTS/CTS (request-to-sender/clear-to-send) polling interaction and point coordination for time bounded services. As shown in FIG. 1, after a busy medium period, all wireless LAN devices have to wait during a so called IFS (inter frame spacing) period and then they can attempt to transmit after waiting the required random number of slot time intervals as long as there are no other transmissions.

With reference to co-channel medium reuse, the IEEE 802.11 DSSS standard provides for acceptable capture properties, which allows the usage of a less sensitive defer threshold leading to better medium reuse conditions. However, a less sensitive defer threshold means that the range at which the corruption of transmissions is prevented is smaller. In access point based networks and ad-hoc networks with a server station, the traffic goes to and from the access point or server station. The minimum receive level at which access point/server station and its assigned stations receive each other is difficult to predict due to the multipath fading and shadowing effects and due to the changing distance of a mobile network station from the access point.

Thus, there is a need for an improved medium access arrangement that allows for successful reception at a lower level and yet provides for a substantially high co-channel medium reuse and substantially low power consumption.

SUMMARY OF THE INVENTION

The present invention provides an enhanced medium access control (MAC) arrangement for each station within a local area network, by employing two variable parameters. One parameter is referred to as the carrier detect threshold for receiving a desired signal. The carrier detect threshold is the level of the observed carrier signal, below which a network station will not attempt to process data signals. For example, by varying the carrier detect threshold, it is possible to select the signal level above which signals are received and processed. The second parameter is referred to as the defer threshold. The defer threshold is the level of the observed carrier signal, above which a network station will defer the transmission of data signals.

In accordance with one embodiment of the invention, the defer threshold is configured to be more sensitive than the carrier detect threshold such that all stations wanting to transmit a data signal will defer their signal transmission so long as any other network station or the access point is transmitting data signals. The desired cell size of the wireless local area network, and the required capture ratio for good reception are some of the parameters that determine the value of the carrier detect threshold and defer threshold parameters. The less sensitive the defer threshold, the better is the medium reuse. In this way, the optimization of aggregate network throughput and the ability to cover larger distances at lower traffic intensity, can be combined by selecting the appropriate defer and carrier detect thresholds.

Preferably, in accordance with one embodiment of the invention, the same defer threshold is utilized for all stations, including the cell area's corresponding access point.

However, it is to be understood that the carrier detect threshold can be advantageously varied selectively for each station. In other words, a sensitive carrier detect threshold will cause the transceiver chip to do processing more often than a less sensitive carrier detect threshold. Advantageously, a less sensitive carrier detect threshold allows for reduced battery power consumption, which, as evident to those skilled in the art, is important for battery operated mobile network stations.

BRIEF DESCRIPTION OF THE DRAWINGS

One embodiment of the invention will now be described by way of example, with reference to the accompanying drawings, in which.

DETAILED DESCRIPTION

Figure 2:
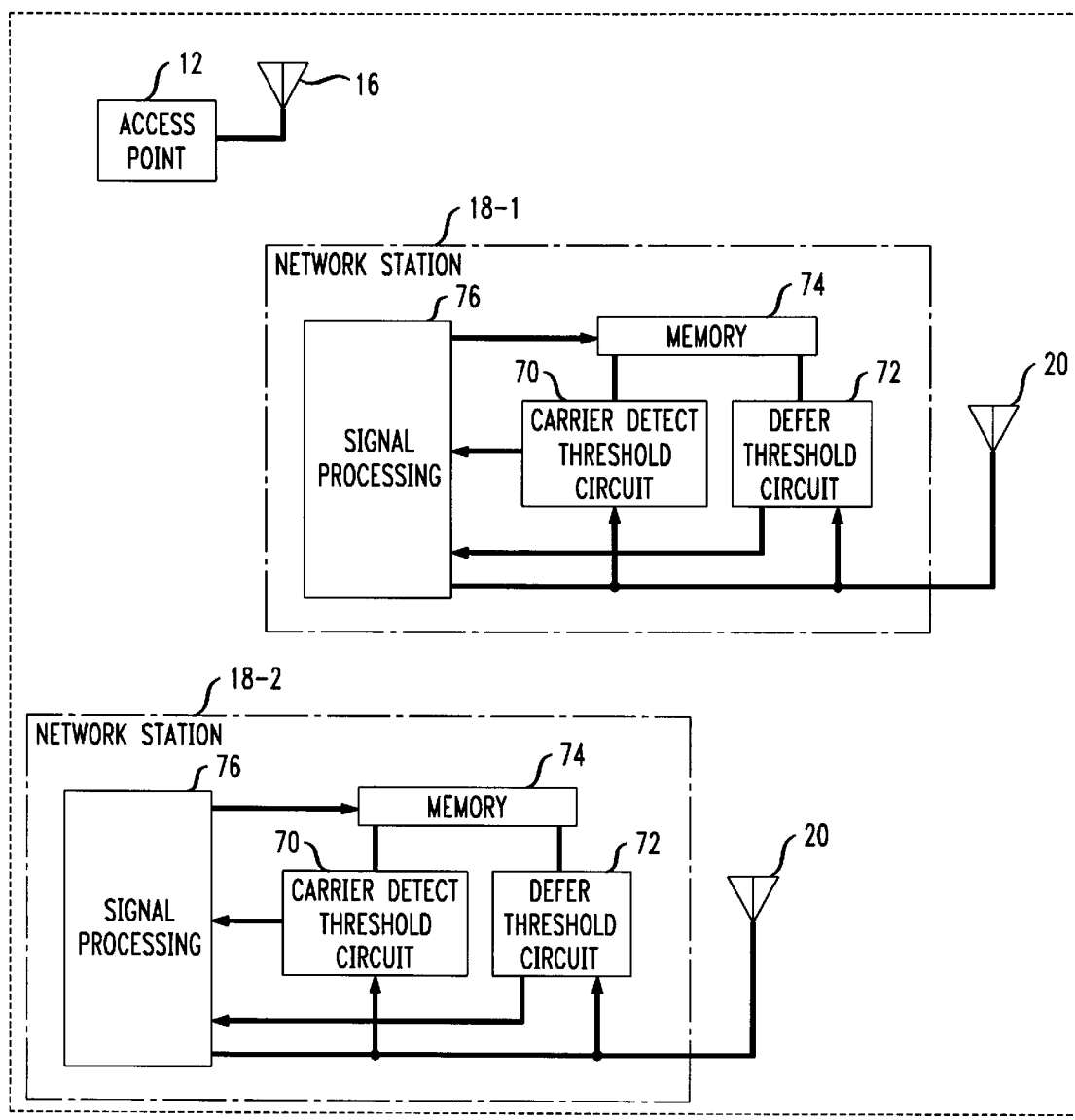
FIG. 2 is a block diagram of a wireless local area network including an access point and two mobile network stations in accordance with one embodiment of the present invention.

With reference to FIG. 2 there is shown a preferred embodiment of a wireless local area network (LAN) 10 in which the present invention is implemented. Local area network 10 includes an access point 12, which serves as a base station as described above. However, the invention is not limited in that respect and other types of local area networks that employ a server station for forwarding messages back and forth to network stations may be employed. Access point 12 may be connected to other devices and/or networks with which network stations in the LAN 10 may communicate. Access point 12 includes an antenna 16 configured to transmit and receive data signals over a communications channel.

Network 10 also includes mobile network stations 18, such as mobile stations 18-1, 18-2, each having an antenna 20. The mobile stations are capable of transmitting and receiving messages selectively at a data rate of 1 Mbit/s (Megabit per second) or 2 Mbit/s, using direct sequence spread spectrum (DSSS) modulation, although the invention is not limited in scope in that respect. Each mobile station 18 includes a carrier detect threshold circuit 70 and a defer threshold circuit 72, adapted to receive signals via antenna 20. A memory 74 is configured to store the values of carrier detect threshold parameter and defer threshold parameter. An output port of memory 74 is coupled to an input port of carrier detect threshold circuit 70. Similarly another output port of memory 74 is coupled to an input port of defer threshold circuit 72. As such memory 74 provides a signal to carrier detect threshold circuit 70 that corresponds to a desired carrier detect threshold parameter. Similarly, memory 74 provides a signal to defer threshold circuit 72 that corresponds to a desired defer threshold parameter.

Mobile network station 18 further includes a signal processing circuit 76 that is configured to process the signals received via antenna 20. Signal processing circuit 76 also processes the signals that are intended to be transmitted by mobile network station 18 via antenna 20. An input port of signal processing circuit 76 is configured to receive a detect indication signal from an output port of carrier detect threshold circuit 70. Similarly another input port of signal processing circuit 76 is configured to receive a defer indication signal from an output port of defer threshold circuit 72. An output port of signal processing circuit 76 is coupled to an input port of memory 74 so as to vary the values of carrier detect threshold parameter and defer threshold parameter stored in memory 74.

In accordance with one embodiment of the present invention, each mobile network station 18 receives data signals on a time slot basis during its signal receiving mode, although the invention is not limited in scope in that respect. During a time slot period, such as 20 μs, carrier detect threshold circuit and defer threshold circuit determine the energy level of the incoming signal. Carrier detect threshold circuit 70 monitors the incoming data signal received via antenna 20. When a carrier signal is detected with an energy level above the carrier detect threshold parameter, carrier detect threshold circuit 70 provides a detect indication signal to signal processing circuit 76. In response signal processing circuit 76 begins to process the signal received via antenna 20. When the energy level of the received signal is also above the defer threshold parameter, defer threshold circuit 72 provides a defer indication signal to signal processing circuit 76 so as to inform the mobile network station that no transmissions may be made in order to avoid collisions over the communications channel employed by local area network 10.

Figure 3:
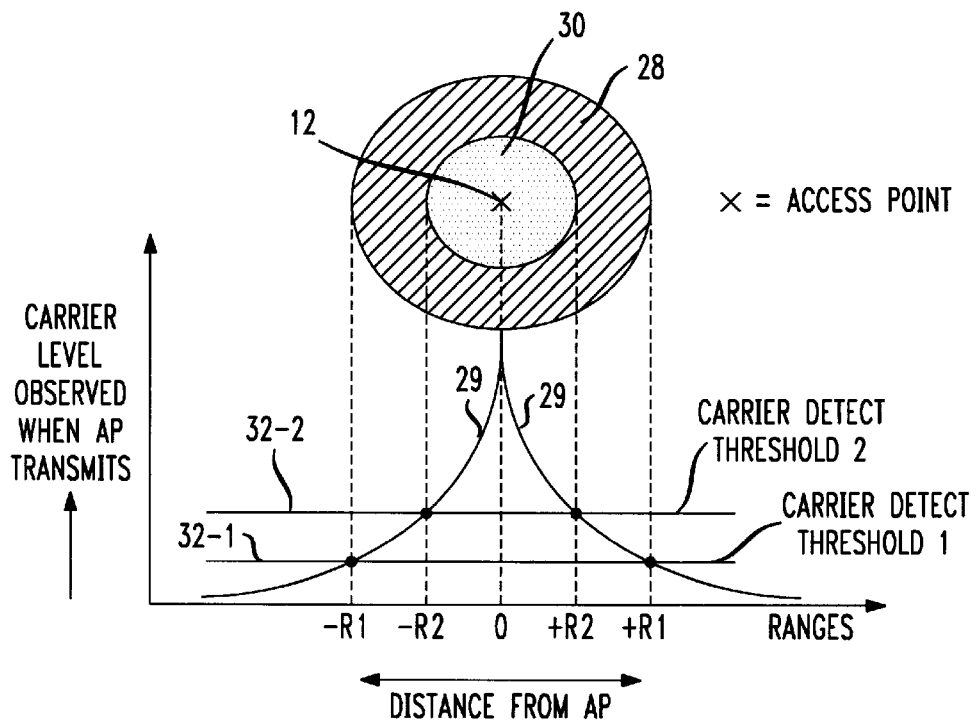
FIG. 3 is a plot illustrating the power observed by a network station, as a function of distance, when the corresponding access point transmits a signal, and the effect of two exemplary carrier detect threshold levels on the size of a local area network cell in accordance with one embodiment of the invention.

Referring to FIG. 3, an isolated cell situation is illustrated from the access point 12 perspective. The carrier signal level observed by mobile network stations remotely located from access point 12 is illustrated by curve 29 as a function of the distance of a network station from the access point. Curve 29 is determined by the transmit power used at the access point and the path-loss characteristics of the environment. The receiver capability of a station within the isolated cell is determined by the carrier detect threshold levels, such as carrier detect thresholds illustrated by lines 32-1 or 32-2. As previously mentioned, the carrier detect threshold level is defined as the carrier signal level, below which LAN stations 18-1, 18-2 will not process the incoming data signals. As illustrated carrier detect threshold level 32-2, intersects with curve 29 at the distances −R2 and +R2, and carrier detect threshold level 32-1 intersects with curve 29 at the distances −R and +R. The distances at which the carrier detect threshold level line crosses the carrier signal level curve determines the boundaries of the local area network cell, within which mobile network stations may communicate with access point 12.

As is evident, with the lower more sensitive carrier detect threshold 32-1, operation and reception over a wider range is accomplished. The resulting cell by employing carrier detect threshold level 32-1 is illustrated as cell 28. Similarly, the resulting cell by employing carrier detect threshold 32-2 is illustrated as cell 30. It is noted that network stations operating with a carrier detect threshold level 32-2 are less sensitive than network stations operating with a carrier detect threshold level 32-1.

The range of meaningful values for the carrier detect threshold level has a lower boundary determined by the sensitivity of the receiver circuitry. For example, setting the carrier detect threshold to a lower value will result in a number of meaningless receive attempts, which may lead to substantially high failure rate. By employing a less sensitive carrier detect threshold parameter, the network stations of a local area network may be able to operate within smaller cell sizes. Such small cell sizes may be preferred when considering the possibilities for re-use of the same channel in a relatively small area. Conversely, with the lower, more sensitive carrier detect threshold level one can operate over a wider range.

Figure 4:
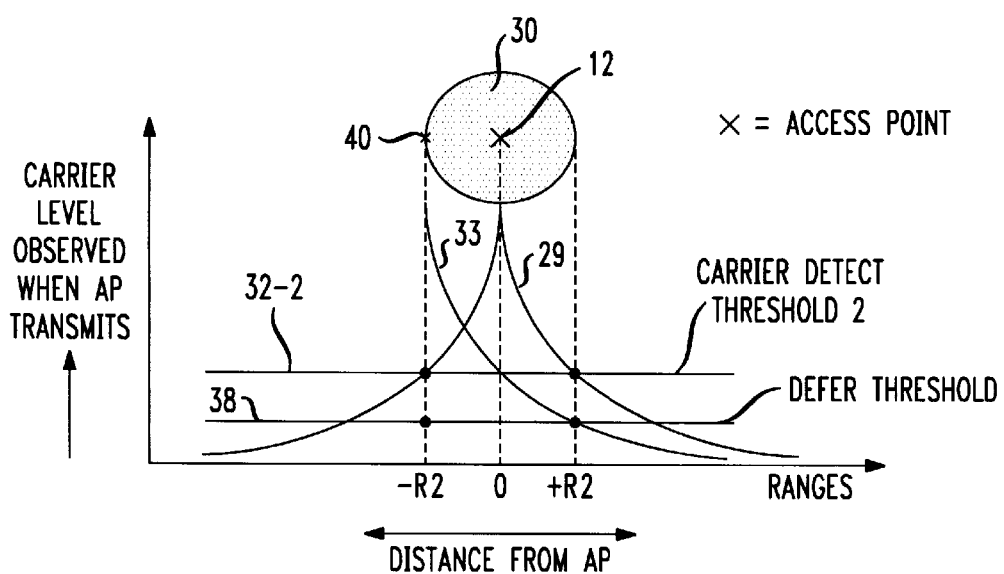
FIG. 4 is a plot illustrating the relationship between the defer threshold and the carrier detect threshold for a wireless local area network in accordance with one embodiment of the present invention.

With reference to FIG. 4, in accordance with one embodiment of the invention, the preferred relation between the defer threshold level illustrated as line 38 and the carrier detect threshold level illustrated as line 32-2 is shown. FIG. 4 illustrates the situation where the defer threshold is set at a level below—more sensitive than—the carrier detect threshold, although the invention is not limited in scope in that respect. For example, in accordance with other embodiments of the invention, the carrier detect threshold and the defer threshold may be varied such that they attain substantially the same level, or the carrier detect threshold is lower than the defer threshold.

In accordance with one embodiment of the invention, in order to determine the defer threshold level for a given carrier detect threshold, a station, such as 40 at one side of the cell, for example at a distance R2, must be taken and curve 33 corresponding to its carrier signal power be plotted as a function of distance from station 40. Thus, curve 33 illustrates the graph of observed level of a carrier signal, also referred to as a carrier signal curve, received from station 40 as a function of distance. The level where curve 33 crosses the other side of the cell, for example at +R2, defines the defer threshold level, identified as line 38, for this embodiment of the invention.

Accordingly, if there is a transmission from access point 12 the level that any station in the gray area will respond to will be above the carrier detect threshold level 32-2. As such, all stations will only receive what is transmitted within the circle or cell size 30. However, the level of the observed carrier signal, above which each station will defer transmission is set at defer threshold level 38.

The medium access control arrangement illustrated in FIG. 4 substantially eliminates the so called hidden terminal problem. The hidden terminal problem occurs when two terminals that cannot observe each other send a message to a third terminal, such as the access point, at the same time. At this third terminal, such as access point 12, the two signals interfere with each other leading to a co-channel interference. The third terminal will at best receive one of the two messages, and often looses both messages at the cost of precious bandwidth.

However, with the use of the medium access control arrangement of FIG. 4, a station on one edge of the cell defers for a station at the farthest other edge of the cell. This is accomplished, as explained before, by plotting the curve for one edge station and ensuring that the defer level crosses this curve at the other cell edge. Choosing this level provides for a local area network where all network stations defer to each other and where each station can communicate with access point 12. As a result the hidden terminal problems within the group of stations belonging to the cell, is substantially eliminated.

The range of the defer threshold has a lower boundary determined by the sensitivity of the carrier detect circuitry. Below a certain level, the signal will not be detected and no defer will be done. The preferred relation shown in FIG. 4 cannot be achieved in the case where the carrier detect threshold 32-2 is set to the lowest and most sensitive level possible. In that case, the lowest meaningful defer threshold will not guarantee the wanted deferral between two "edge stations" as shown in FIG. 5.

Figure 1:
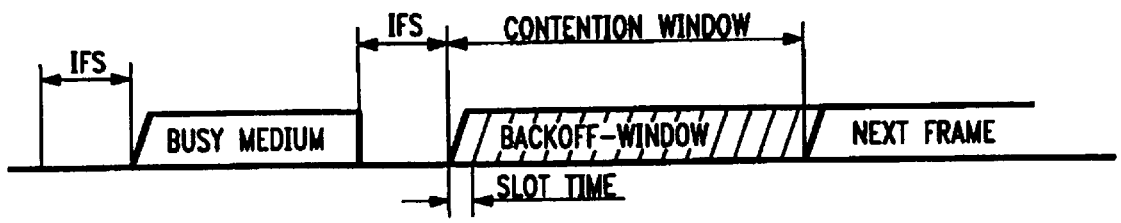
FIG. 1 is a plot of a timing diagram illustrating the operation of a prior art carrier sense multiple access with collision avoidance arrangement.
Figure 5:
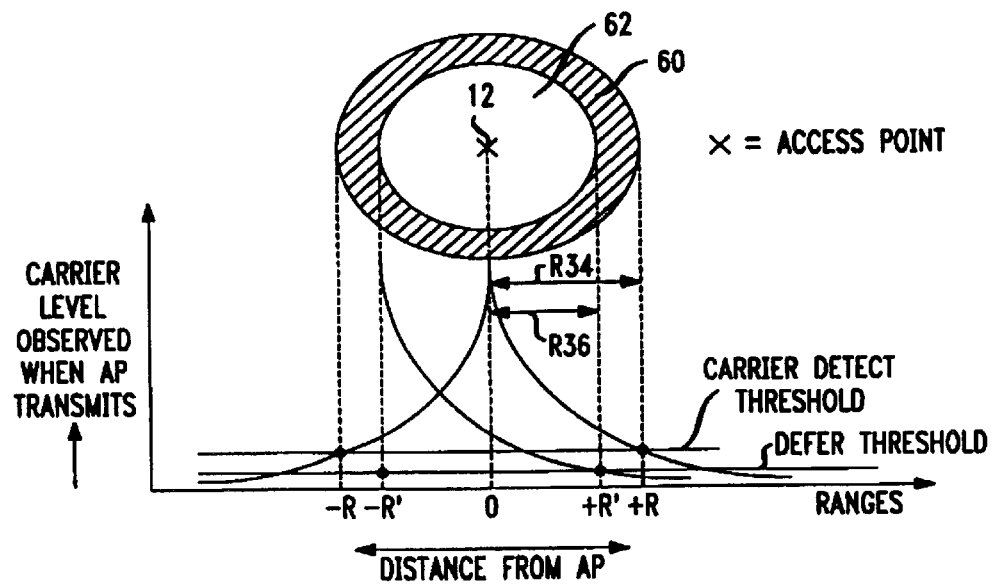
FIG. 5 is a plot illustrating the effect of increasing the sensitivity of the carrier detect threshold level in accordance with one embodiment of the present invention.

When choosing a low carrier detect threshold value, a large cell size with a radius R 34 is created and is shown in FIG. 5. When plotting the lowest meaningful defer threshold, the area where mutual deferral occurs has a smaller size which is shown in the smaller circle having radius R 36. When utilizing this combination of thresholds, the network stations may employ a channel access arrangement referred to as request-to-send/clear-to-send (RTS/CTS) medium reservation mechanism to substantially avoid the hidden station phenomenon. This channel access arrangement is described in more detail in R. O. La Maire, A. Krishna, P. Bhagwat, J. Panian, *Wireless LANs and Mobile Networking: Standards and Future Directions*, IEEE Communications Magazine, vol. 34, no. 8 pp. 86–94 (Aug. 1996), incorporated herein by reference.

Referring to FIG. 5, the total cell area 60 is referred to as basic coverage area (BCA). Using this terminology, the smaller area 62 is called the shared coverage area (SCA) to indicate that in this area medium sharing rules in accordance with the present invention will be in effect. In a preferred arrangement, the shared coverage area SCA is substantially equal to the basic coverage area BCA.

When creating a cellular infrastructure system with the above defined thresholds for the low level receiver and transmitter control, it is evident to those skilled in the art that proper balance with roaming thresholds should be maintained as discussed hereinafter. Where the carrier detect threshold 32-2 and the defer threshold 38 determine transmit/receive behavior of stations and access points which belong to the same cell, a roaming threshold level determines the instances where a mobile network station decides to start up or stop participation in a cell. It is noted that a network station may base its handover decisions on the currently configured capabilities of the receiver. In particular, when small cell sizes are required, the roaming thresholds must be set such that stations will start searching for a new access point in advance of the moment when the receiver becomes physically incapable of receiving messages from the current access point.

Additionally, in accordance with the principles of the present invention, it is possible to define variable cell sizes that translate directly into the possibility to control the density of cells and or access points to cover a certain area. Many small cells in a certain area will mean more re-use of the same channel, and thus better overall throughput than few large cells.

By employing a variable threshold level for setting carrier detect threshold and defer threshold, in accordance with the present invention, it is possible to reduce the cell size, so as to increase the re-use of same frequencies in a given area. One approach to reduce cell sizes is to decrease the transmit power of each access point. Advantageously, another approach is to raise the carrier detect and defer threshold layers in accordance with an exemplary embodiment of the present invention as discussed above. Thus each station ignores most of the signals in the cell area and attempts to listen to those signals that are intended for it. Furthermore, each station attempts to transmit a signal and not to defer, because of the smaller size of the cell, knowing that the intended receiver is within this small cell area.

The present invention may be implemented in the state machine of a MAC controller. When utilizing a state machine transceiver, and when a valid modem carrier signal is detected with a receive level above the carrier detect threshold, the transceiver considers this as a valid modem carrier signal and starts the receiving process. When the receive level of the valid modem signal is above the defer threshold, then the transceiver reports to the MAC controller that the medium is occupied by making the control line signal active.

It should be understood that the preferred embodiments and examples described are for illustrative purposes only and are not to be construed as limiting the scope of the present invention which is properly delineated only in the appended claims.

What is claimed is:

1. A method of operating a wireless local area network station comprising the steps of:
    establishing a variable carrier detect threshold level, so as to define a range of signal levels above which received signals are processed;
    establishing a variable defer threshold level, above which transmission of signals is deferred
    receiving a carrier signal having a corresponding power signal level;
    transmitting a signal when said power signal level is below said defer threshold; and
    processing said carrier signal intended for said network station when said power signal is above said variable carrier detect threshold level.

2. A method in accordance with claim 1 further comprising the step of varying said variable carrier detect threshold level and said variable defer threshold level.

3. A method in accordance with claim 1, further comprising the step of establishing said variable carrier detect threshold level to a level above said variable defer threshold level.

4. A method in accordance with claim 1, further comprising the step of establishing said variable carrier detect threshold level to a level approximately equal to said variable defer threshold level.

5. A method in accordance with claim 1 further comprising the step of establishing said variable carrier detect threshold level to a level below said defer threshold level.

6. A method in accordance with claim 1 further comprising the step of selecting a carrier detect threshold signal level so as to define a communication cell within which a plurality of mobile network stations communicate with a predetermined base station.

7. A method in accordance with claim 6 wherein said step of establishing defer threshold level comprises the steps of selecting a defer threshold signal level such that it is approximately equal to a power level along the power/distance curve of a station located at one edge of said communication cell at a distance approximately located at the opposite side of said communication cell.

8. A method in accordance with claim 1 wherein the size of said communication cell is a function of said carrier detect threshold and said defer threshold.

9. A wireless local area network station adapted to transmit and receive a signal within a communication cell, comprising:
    a carrier detect threshold circuit configured to receive a carrier signal having a power signal level, said carrier detect threshold circuit generating a carrier detect indication signal when said power signal level is substantially equal or larger than a variable carrier detect threshole level, so as to define a range of signal levels above said variable carrier detect threshole level wherein received signals are processed;
    a defer threshold circuit configured to receive said carrier signal having said power signal level, said defer threshold circuit generating a defer indication signal when said power signal level is substantially equal or larger than a specifiable defer threshold parameter, above which transmission of signals is deferred; and
    a signal processing circuit coupled to said carrier detect threshold circuit and said defer threshold circuit so as to receive said carrier detect indication signal and said defer indication signal such that said signal processing circuit processes signal received by said network station in response to said carrier detect indication signal and said signal processing circuit defers transmission of signals by said network station in response to said defer indication signal.

10. The system in accordance with claim 9 wherein the levels of said carrier detect threshold level and said defer threshold level are variable.

11. The system in accordance with claim 10, wherein said carrier detect threshold level is above said defer threshold level.

12. The system in accordance with claim 10, wherein said carrier detect threshold level is approximately equal to said defer threshold level.

13. The system in accordance with claim 10 wherein said carrier detect threshold level is below said defer threshold level.

14. The system in accordance with claim 9 wherein said defer threshold level is approximately equal to a power level along the power/distance curve of a station located at one edge of said communication cell at a distance approximately located at the opposite side of said communication cell.

15. The system in accordance with claim 9 wherein the size of said communication cell is a function of said carrier detect threshold and said defer threshold.

* * * * *